Jan. 18, 1949.  H. H. HOOK  2,459,528
APPARATUS FOR TAKING RADIOGRAPHS
Filed May 13, 1944
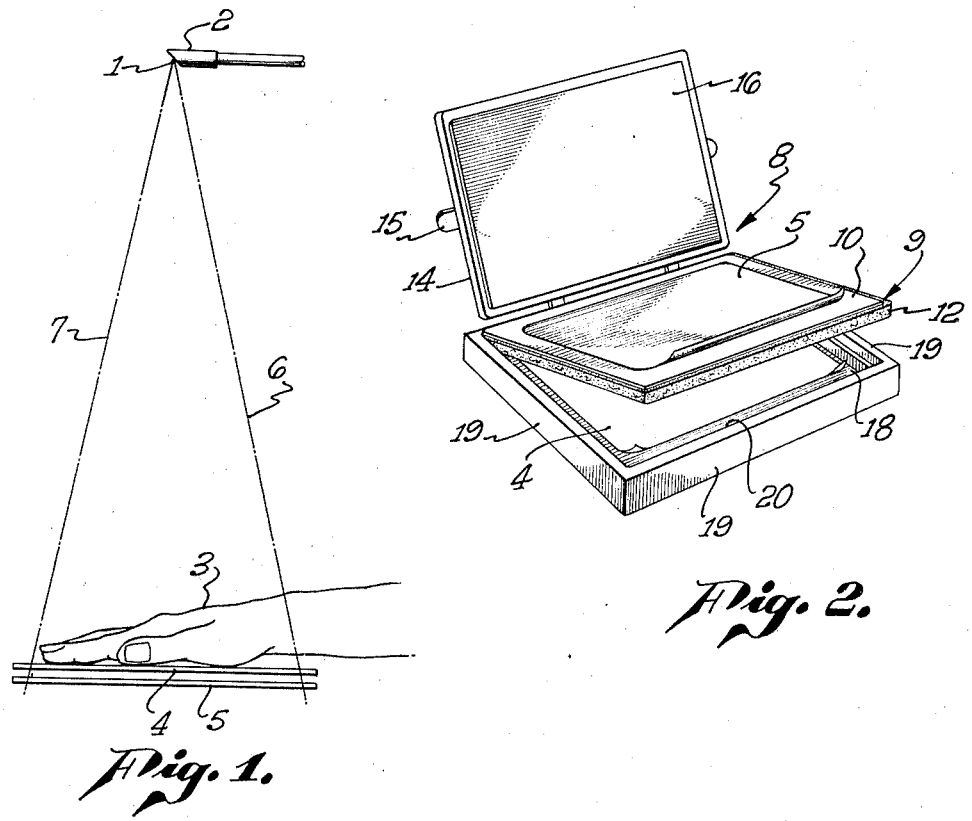
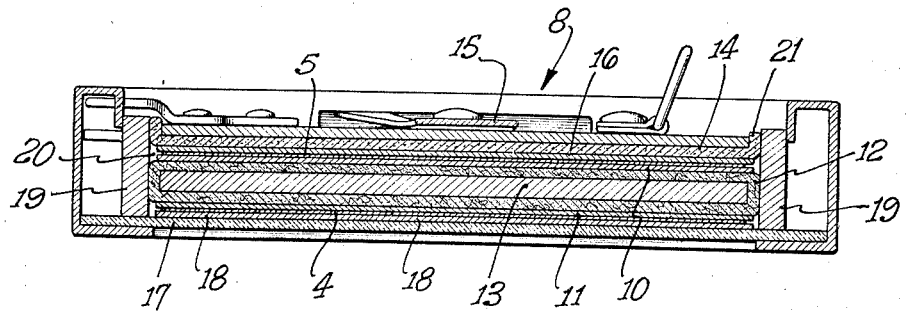
Harry H. Hook,
INVENTOR.
BY W E Beatty
ATTORNEY.

Patented Jan. 18, 1949

2,459,528

UNITED STATES PATENT OFFICE 2,459,528

APPARATUS FOR TAKING RADIOGRAPHS

Harry H. Hook, Los Angeles, Calif.

Application May 13, 1944, Serial No. 535,419

3 Claims. (Cl. 250—65)

The invention relates to method of and apparatus for taking radiographs and has for an object to increase the amount of detail which can be seen when viewing the radiographs, whereby the different layers or depths in the object field appear more clearly, while nevertheless requiring an exposure from only a single focal point.

As a radiograph is fundamentally only a shadow-graph, a single radiograph shows the object in a flat field wherein it is usually difficult if not impossible to see the different layers in the object field. This has been overcome by taking stereoscopic X-ray pictures which involves making an exposure on one film with the X-ray tube in one position, and then shifting the X-ray tube to a second position and taking another exposure on a second film. The two films thus exposed from different focal points are viewed in a stereoscope and an impression of depth is obtained. However, this practice has the defect that the body muscles or organs of the patient being X-rayed may voluntarily or involuntarily move between the two exposures, and in this event the two radiographs do not match and a satisfactory pair of right and left eye pictures is not obtained.

According to the present invention, this defect is overcome and more detail is obtained than is present on a single radiograph, by making an exposure from a single focal point on two films spaced slightly apart. If the two films are so close together that substantially identical images are obtained, no improvement results. On the other hand if the two films are so far apart that the contour lines in the two object fields do not merge, then the eyes see two separate pictures when viewed in a stereoscope, and no improvement results. If, however, the average focal film distances of from thirty to forty inches is employed, and if the films are approximately ¼" apart, the contour lines in the object field on the slightly enlarged image of the more distant film will merge with the contour lines in the nearer film and when such films are viewed in a stereoscope the various layers in the object film appear more clearly than they do in either one of the two films.

The invention also provides an improved cassette for removably holding two films slightly spaced apart for simultaneous exposure of both thereof from a single focal point as above explained.

For further details of the invention reference may be made to the drawings wherein Fig. 1 is a schematic view in elevation of an arrangement for simultaneously exposing two films from a single focal point.

Fig. 2 is a view in perspective of an improved cassette which may be employed in practicing the method of this invention, the lid being shown open.

Fig. 3 is an enlarged sectional view in elevation of the cassette of Fig. 2, with the lid closed.

Referring in detail to the drawings, in Fig. 1 the single focal point 1 of X-rays is taken as the base of the anode 2 of a conventional X-ray tube not illustrated. The human hand 3 is illustrated as an example of an object to be X-rayed and therebelow are arranged two parallel films 4 and 5, spaced about ¼" apart and simultaneously exposed from a single focal point 1. As illustrated by the lines 6, 7, and in accordance with tests which have been made, the X-rays slightly diverge from the anode 2, whereby an image of usual size is recorded on the film 4, while a slightly enlarged image of that object is recorded on the more distant film 5.

In order to provide for simultaneous exposure of the films 4 and 5, and to hold them parallel and about ¼" apart, use may be made of the improved cassette 8 shown in Figs. 2 and 3.

Cassette 8 is a box-like member and generally resembles cassettes now on the market, except that it is deeper and has a removable insert 9 having a sensitizing screen 10 on its upper surface and a similar sensitizing screen 11 on its lower surface. These screens 10 and 11 are suitably secured to a felt backing 12 arranged on a non-metallic base or separator 13 which may be of Bakelite or the like, and which is transparent to X-rays.

As usual, the cassette 8 has a pivoted top 14 with a pivoted spring handle 15 on top thereof, and a sensitizing screen 16 on its inner surface. Also, as usual, the cassette 8 has a bottom wall 17 of Bakelite or the like transparent to X-rays and on top of which is arranged a sensitizing screen 18. All sensitizing screens described herein, as usual may be of calcium tungstate or the like. The cassette 8 has a side wall 19 which provides a compartment 20 in which the insert 9 and the lid 14 slidingly fit, the felt 12 on the insert 9 and the felt 21 on the lid 14 fitting in the compartment 20 and providing a light seal.

The cassette 8 may be loaded with film by placing a film 4 on the sensitizing screen 18 in the bottom of the cassette, then the insert 9 is fitted in the cassette and the film 5 is placed on the top of the insert 9 and the lid 14 is closed and locked. The cassette 8 is then turned upside down, as the exposure is made through the bottom 17. The cassette thus holds the two films 4 and 5 parallel to each other, preferably ¼" apart, the means separating the films 4 and 5 permitting simultaneous exposure of both thereof, the film 4 having on its opposite sides the sensitizing screens 11 and 18, while the film 5 has on its opposite sides the sensitizing screens 10 and 16.

After the films 4 and 5 have been simultaneously exposed from a single focal point, these films are developed and on viewing them in a stereoscope, a better diagnosis may be made than if a single radiograph were viewed.

It will be apparent that various modifications may be made in the invention without departing from the spirit of the following claims.

For example, the insert or central section 9 may be secured in fixed position in the cassette 8, and both the top and the bottom of the cassette may be hinged to the frame 21 of the cassette 8. Alternatively, the construction shown in Fig. 2 may be employed except that the insert or central section 9 may be secured by a hinge, not shown, to the frame 21 of the cassette 8.

I claim:

1. An insert for a cassette, said insert comprising means transparent to X-rays for supporting two intensifying screens on its opposite sides about ¼" apart.

2. An insert according to claim 1 wherein said means comprises a flat plate of non-metallic material covered on its opposite sides with felt to which said screens are secured.

3. A cassette comprising a box-like member having a bottom and a pivoted top with an intensifying screen on the inside of said top and a second screen on the inside of said bottom, said top when closed supporting said screens parallel to each other and spaced apart approximately ¼", and a central section in said box-like member and having a screen on its opposite sides and being approximately ¼" thick.

HARRY H. HOOK.

REFERENCES CITED

The following references are of record in the file of this patent:

UNITED STATES PATENTS

| Number | Name | Date |
|---|---|---|
| 1,408,559 | Zulauf | Mar. 7, 1922 |
| 1,879,498 | Richards et al. | Sept. 27, 1932 |
| 1,960,373 | Dreyer | May 29, 1934 |
| 2,003,254 | Drexel | May 28, 1935 |

FOREIGN PATENTS

| Number | Country | Date |
|---|---|---|
| 71,745 | Austria | May 25, 1916 |
| 699,582 | Germany | Dec. 2, 1940 |